Nov. 20, 1923.                                                   1,474,446
                       C. S. SCHROEDER
                      CONTROLLING MEANS
              Filed May 27, 1921          3 Sheets-Sheet 1
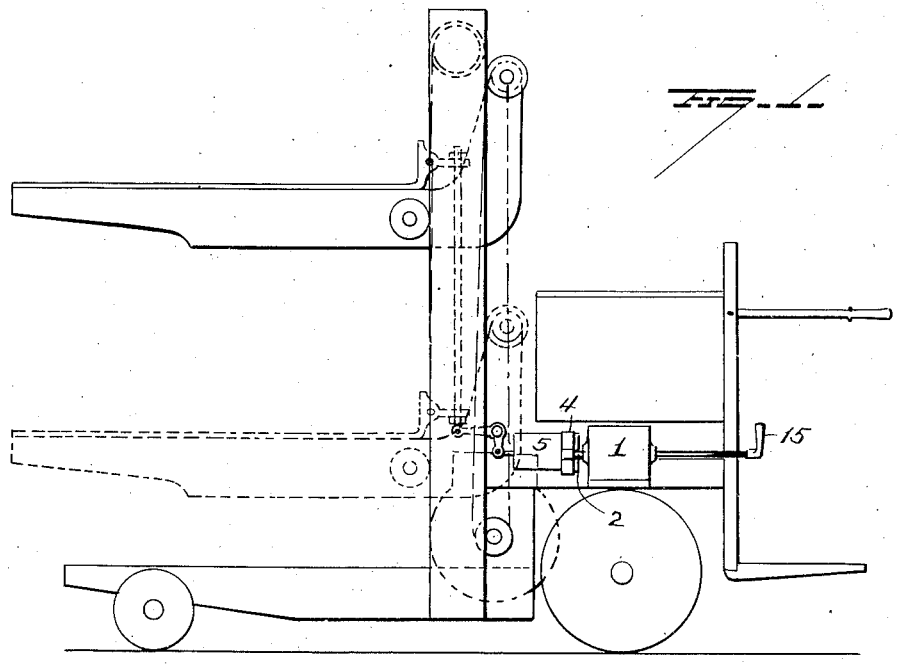
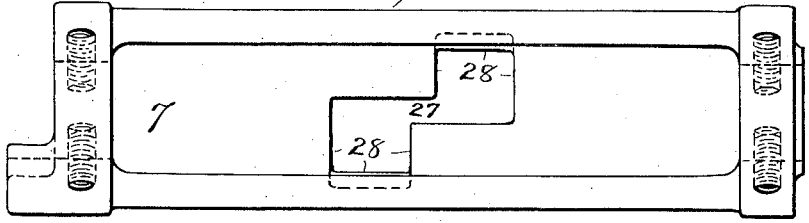
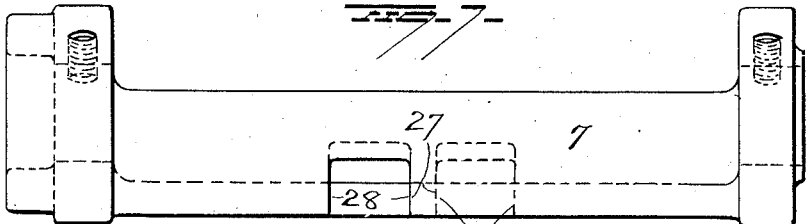
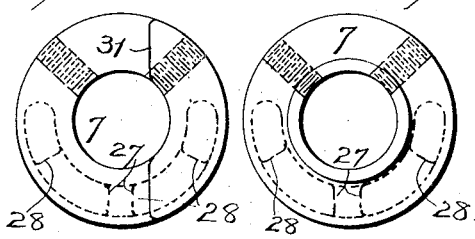

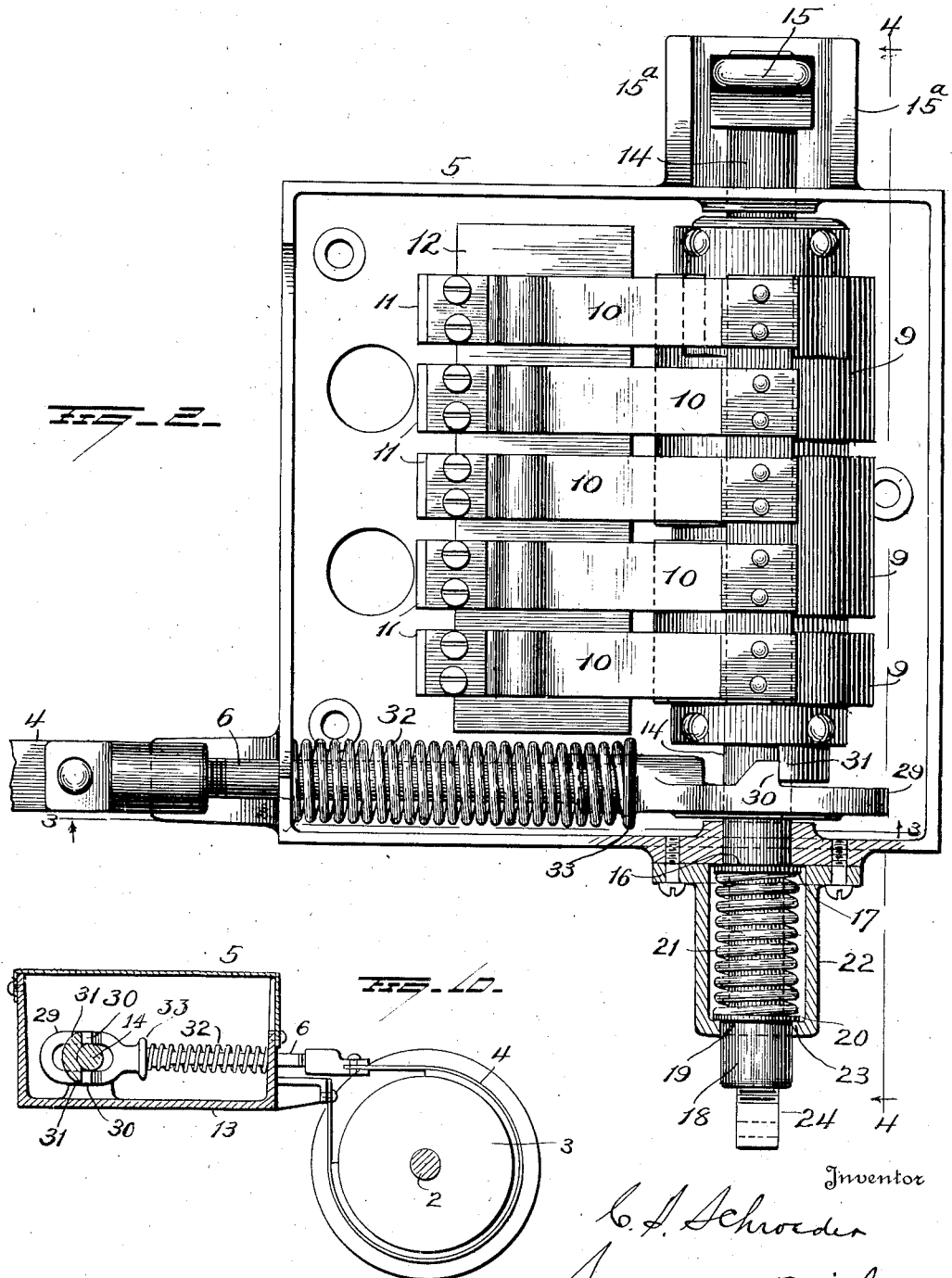

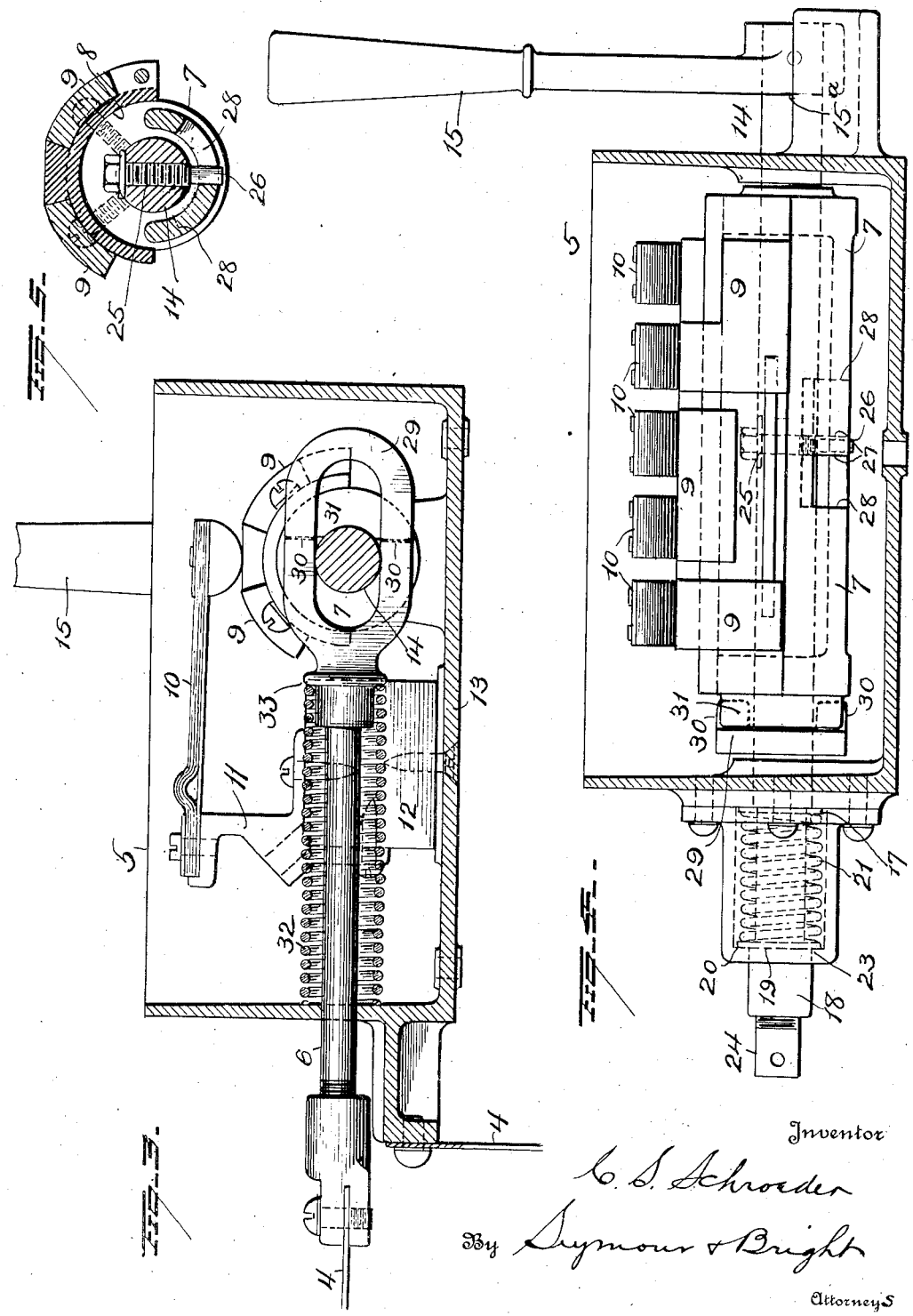

Patented Nov. 20, 1923.

1,474,446

UNITED STATES PATENT OFFICE.

CHARLES S. SCHROEDER, OF STAMFORD, CONNECTICUT, ASSIGNOR TO THE YALE & TOWNE MANUFACTURING COMPANY, OF STAMFORD, CONNECTICUT.

CONTROLLING MEANS.

Application filed May 27, 1921. Serial No. 473,082.

*To all whom it may concern:*

Be it known that I, CHARLES S. SCHROEDER, a citizen of the United States, and a resident of Stamford, in the county of Fairfield and State of Connecticut, have invented certain new and useful Improvements in Controlling Means; and I do hereby declare the following to be a full, clear, and exact description of the invention, such as will enable others skilled in the art to which it appertains to make and use the same.

This invention relates to improvements in controlling means and more particularly to means for controlling the operation of electrically actuated apparatus,—one object of the invention being to provide simple and efficient mechanical means cooperable with an electric controller for operating a brake for the electric motor included in the circuit of said controller.

A further object is to so construct an electric controller that it shall be operable automatically by limit stop means to open the circuit of an electric motor.

A further object is to construct an electric controller in such manner that it shall be controllable automatically by the apparatus with which an electric motor included in circuit with said controller is adapted to actuate, to reset the contact devices to neutral positions to open the motor circuit when a moving part of the apparatus operated by said motor reaches a limit of travel.

With these and other objects in view, the invention consists in certain novel features of construction and combinations and arrangement of parts as hereinafter set forth and pointed out in the claims.

In the accompanying drawings; Figure 1 is a view illustrating an embodiment of my invention; Figure 2 is a plan view of the controller, with the cover of the casing removed; Figure 3 is a transverse sectional view on the line 3—3 of Figure 2; Figure 4 is a view on the line 4—4 of Figure 2, and Figures 5, 6, 7, 8, 9 and 10 are detail views.

An electric motor is indicated at 1 and on the shaft 2 of this motor, a brake wheel 3 is secured. A brake band 4 is cooperable with the brake wheel and is connected with an operating rod 6 mounted in the casing of an electric controller 5 and cooperable mechanically with movable parts of the latter, as hereinafter specifically explained, to control the application of the brake.

The electric controller shown in the drawing is of the drum type comprising a metal drum 7 having a covering 8 of bakelite or other suitable insulating material on which the contact plates 9 are secured, and a series of spring contact fingers 10 to cooperate with said contacts; the fingers 10 being carried by suitable holders 11 secured to a block 12 of wood or other insulating material fastened in the casing 13 in which the controller mechanism is mounted and enclosed. The contacts and contact fingers are included in the circuit of the motor and suitable resistance elements in a manner well known in the art,—the circuits and arrangements of contact devices being such that when the drum is turned in one direction the motor will be operated in one direction at one of two or more speeds and that when the controller drum is turned in the opposite direction from its neutral position, the direction of the rotation of the motor will be reversed and caused to rotate at one of two or more speeds, at the will of the operator.

The drum 7 of the controller is mounted loosely on a shaft 14 which extends through the same and is movable longitudinally with relation thereto. The shaft 14 is mounted near one end in one wall of the casing 13 and projects beyond said wall for the reception of an operating handle 15. The other end of said shaft passes through and beyond the oppostie wall of the casing and the portion thereof which normally projects beyond the casing is contracted somewhat in diameter, thus forming a shoulder 16 against which a ring 17 bears, said ring also bearing against the casing. A sleeve 18 is fixed to the end of this projecting portion of the shaft and forms a shoulder 19 against which a ring 20 bears, and a spring 21 encircling the contracted portion of the shaft bears at its respective ends against the rings 17 and 20. A housing 22 secured to the casing encloses the spring 21 and the projecting portion of the shaft 14 which it encircles. The free end of the shaft 14 and the sleeve 18 thereon projects through the free end of the housing 22 and the latter is formed at its free end with an annular shoulder 23 to form an abutment for the ring 20 against which the outer end of the spring 21 bears. By these means, the shaft 14 is retained in its normal position relatively to the drum and the casing but is capable of longitudinal movement against the resistance of the spring 21. The free end of the shaft 14 is provided with a threaded socket to receive a threaded pin 24, which serves as means for connection of suitable limit stop devices operable by a moving part of apparatus driven by the motor 1, to move the controller shaft 14.

The controller shaft 14 is connected with the drum through the medium of a pin-and-slot construction; viz: a pin 25 carried by the shaft 14 having a part 26 normally disposed in the intermediate portion 27 of a slot in the wall of the controller drum 7 and said slot having enlarged portions 28, 28 extending in opposite directions laterally from respective ends of the narrower intermediate slot portion 27. It will be apparent that by connecting the controller shaft with the drum as above described, motion imparted by operation of the controller handle will normally be transmitted by the shaft to the drum to turn the latter in one direction or the other to shift the electrical connections. Turning movement of the controller drum may be limited to prevent the contact plates thereon from being moved past the contacts on the spring fingers, by engagement of the hand operating lever with stops 15ᵃ on the casing. When a moving part of the apparatus driven by the motor reaches the limit of its travel, the controller shaft will be moved longitudinally by operation of the limit stop devices and the part 26 of the pin 25 will be moved from the contracted intermediate portion 27 of the slot in the drum into one or the other enlarged portions 28 of the slot (according to the direction in which the shaft 14 has been moved longitudinally by the operation of the limit stop devices) and the drum will be free to return to its original or neutral position after having been previously operated to effect the closing of the controller contact devices. Under such conditions, the drum will be returned to neutral position to effect the automatic opening of the motor circuit, by means of devices hereinafter described.

The rod 6 (which is connected with the brake as previously stated) is mounted within the controller casing and disposed at right angles to the controller shaft 14,—said rod having at one end a yoke or slotted member 29 through which the controller shaft passes. This yoke or slotted member is provided with diametrically opposite shoulders or lugs 30, 30 (one over and the other under the controller shaft), and cooperable with these lugs, are lugs 31, 31 carried by the controller drum. A spring 32 on the rod 6 bears at one end against the casing and at the other end against a shoulder 33 on said rod near the yoke 29. This spring serves normally to retain the lugs 30 in contact with the lugs 31 and thus the drum is held normally in neutral position with the motor circuit open. It will also be understood that when the hand operating lever 15 is released by the operator (after the drum has been shifted), the spring 32 will cause co-operation of lugs 30, 31 to return the drum and hand lever to neutral position. The same spring 32 will operate to effect the application of the band brake when the controller drum is in neutral position with the motor circuit open. Thus it will be seen that when the controller is operated to move the drum from "on" to "neutral" position, the brake will be applied by the longitudinal movement of the rod 6 effected by the action of the spring 32 and thus the rotation of the motor will be stopped promptly. It will be apparent that when the drum is turned in either direction from "neutral" to "on" position, the rod 6 will be moved longitudinally to release the brake.

Should the controller shaft be moved longitudinally by the operation of the limit stop devices when the drum is in "on" position with the motor in operation, and the part 26 of the pin 25 is thus moved from the contracted intermediate portion of the slot in the drum to one or the other enlarged portions of said slot, the spring 32 will act promptly, through the rod 6 and one or the other lug 30 cooperating with one or the other lug 31, to effect return of the drum to "neutral" position, thus opening the motor circuit and at the same time cause application of the brake to effect the prompt stopping of the motor and preventing the driven apparatus from overrunning the limit of its normal travel should the manual operation of the controller at the proper time be neglected.

In operation of the mechanism with the use of the hand lever, the drum may be moved from "neutral" to "on" position against the resistance of the spring 32 and the brake will be released by movement of the rod 6, the latter being operated for this purpose by the drum during the turning thereof. When the hand lever is released, the spring 32 will operate to cause return of the drum to "neutral" and the brake to be applied by movement of the rod 6, by said spring. If, during the operation of devices controlled by the motor, the limit stop devices should cause longitudinal movement of the controller shaft (when the drum is at "on" position), the drum would be released and the spring 32 and parts actuated thereby would operate to return the drum to "neutral" and apply the brake, as previously explained.

Various changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. The combination of an electric motor, a brake therefor, an electric controller, mechanical means operable by a movable member of the controller for releasing the brake when the movable member of the controller is moved from neutral position, means for manually operating the movable member of the controller, means for releasing said movable member from its operating means, and means for returning said movable member to neutral position when thus released.

2. The combination of an electric motor, a brake therefor, an electric controller, mechanical means operable by a movable member of the controller for releasing the brake when the movable member of the controller is moved from neutral position, means for manually operating the movable member of the controller, means for releasing said movable member from its operating means, and means for returning said movable member to neutral position when thus released, said last-mentioned means including a spring operable to apply the brake when the movable member of the controller is returned to neutral position.

3. The combination with an electric motor, a brake therefor, and an electric controller of the drum type, of a rod connected with said brake and provided with two lugs disposed opposite to each other, parts on the controller drum to cooperate with one or the other of the lugs when the drum is turned from neutral position, to move said rod to release the brake, and a spring for moving said rod in a direction to apply the brake when the drum is in or returns to neutral position.

4. The combination with the movable member of an electric controller, of a controller shaft, means detachably connecting the said shaft with the movable member of the controller, means for turning said shaft and movable member from neutral position, means operable by limit stop devices for releasing the said movable member from the controller shaft, and means for automatically returning the said movable member to neutral position.

5. The combination of the drum of an electric controller, a longitudinally movable shaft passing through said drum, means normally connecting said shaft and drum, means for turning said shaft to turn the drum, means for connecting said shaft with limit stop means whereby said shaft may be moved longitudinally to disconnect it from the drum after the latter has been moved from neutral position, and means for returning the drum to neutral position when it shall have been disconnected from the shaft.

6. The combination of a drum of an electric controller, said drum provided with a slot having a contracted intermediate portion and enlarged end portions, a longitudinally movable shaft passing through said drum, a pin carried by said shaft and entering the slot in the drum, a spring retaining the shaft normally in position with the pin entering the contracted portion of the slot, means for turning said shaft and drum in either direction from neutral position, and means for returning the drum to neutral position when the shaft is moved longitudinally and the pin carried thereby becomes disposed in either of the enlarged end portions of the slot in said drum.

In testimony whereof, I have signed this specification in the presence of two subscribing witnesses.

CHARLES S. SCHROEDER.

Witnesses:
 CHARLES A. BERRY,
 B. WOLFSON.